United States Patent
Okada

(10) Patent No.: US 8,550,040 B2
(45) Date of Patent: Oct. 8, 2013

(54) COOLING APPARATUS FOR INTERNAL COMBUSTION ENGINE

(75) Inventor: Yoshihiro Okada, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 271 days.

(21) Appl. No.: 13/001,694

(22) PCT Filed: Nov. 26, 2009

(86) PCT No.: PCT/JP2009/069967
§ 371 (c)(1),
(2), (4) Date: Dec. 28, 2010

(87) PCT Pub. No.: WO2011/064864
PCT Pub. Date: Jun. 3, 2011

(65) Prior Publication Data
US 2011/0253075 A1   Oct. 20, 2011

(51) Int. Cl.
*F01P 3/02* (2006.01)

(52) U.S. Cl.
USPC ............... 123/41.76; 123/41.74; 123/41.72; 123/41.29; 60/605.1

(58) Field of Classification Search
USPC ............ 60/605.1; 123/41.17, 41.72, 41.79, 123/41.85, 47 AB, 65 EM, 598
See application file for complete search history.

(56) References Cited

U.S. PATENT DOCUMENTS

| | | | |
|---|---|---|---|
| 4,993,227 A * | 2/1991 | Nagura et al. | 60/605.1 |
| 2007/0119168 A1 * | 5/2007 | Turner | 60/600 |
| 2008/0201034 A1 * | 8/2008 | Eiraku et al. | 701/29 |

FOREIGN PATENT DOCUMENTS

| | | |
|---|---|---|
| JP | 2009-047005 A | 3/2009 |
| JP | 2009-085020 A | 4/2009 |
| JP | 2009-215914 A | 9/2009 |
| JP | 2009-216008 A | 9/2009 |

* cited by examiner

*Primary Examiner* — Lindsay Low
*Assistant Examiner* — Kevin Lathers
(74) *Attorney, Agent, or Firm* — Kenyon & Kenyon LLP

(57) ABSTRACT

An object of the present invention is to ensure appropriate cooling amounts for two exhaust ports, respectively, in an internal combustion engine in which an exhaust port that communicates with an inlet of a turbine of a turbocharger and an exhaust port that does not communicate with the inlet of the turbine are formed in a cylinder head. A cooling apparatus for an internal combustion engine of the present invention has a first exhaust port and a second exhaust port formed in a cylinder head of the internal combustion engine. The first exhaust port communicates with an inlet of a turbine of the turbocharger. The second exhaust port does not communicate with the inlet of the turbine. Each cylinder of the internal combustion engine includes a first exhaust valve that communicates with the first exhaust port and a second exhaust valve that communicates with the second exhaust port. A first cooling water passage through which cooling water that cools the first exhaust port passes and a second cooling water passage through which cooling water that cools the second exhaust port passes are formed in the cylinder head.

12 Claims, 10 Drawing Sheets

COOLING APPARATUS FOR INTERNAL COMBUSTION ENGINE

This is a 371 national phase application of PCT/JP2009/069967 filed 26 Nov. 2009, the content of which is incorporated herein by reference.

TECHNICAL FIELD

The present invention relates to a cooling apparatus for an internal combustion engine.

BACKGROUND ART

An internal combustion engine equipped with a turbocharger is known in which a plurality of exhaust valves are provided per cylinder. In the aforementioned internal combustion engine, only exhaust gas from one of the exhaust valves of each cylinder flows into a turbocharger (turbine), and exhaust gas from another exhaust valve is not allowed to flow into the turbocharger (for example, see Patent Literature 1).

CITATION LIST

Patent Literature

Patent Literature 1: JP-A-2009-47005
Patent Literature 2: JP-A-2009-216008

SUMMARY OF INVENTION

Technical Problem

In the conventional internal combustion engine described above, a turbo-side exhaust port that communicates with the turbocharger and a bypass-side exhaust port that does not communicate with the turbocharger are formed in the cylinder head. A pressure inside the turbo-side exhaust port is approximately the same as a pressure upstream of the turbine, and a pressure inside the bypass-side exhaust port is approximately the same as a pressure downstream of the turbine. Consequently, since exhaust gas inside the turbo-side exhaust port is at a higher pressure than exhaust gas inside the bypass-side exhaust port, the temperature thereof is liable to rise. Hence, the temperature of the turbo-side exhaust port is liable to become higher than the temperature of the bypass-side exhaust port. Consequently, it is necessary to perform fuel amount increase control to prevent an excessive increase in the temperature of the turbo-side exhaust port and a turbine housing downstream thereof. Fuel consumption and emissions are liable to deteriorate due to the fuel amount increase.

The present invention has been made to solve the above described problem, and an object of the present invention is to provide a cooling apparatus for an internal combustion engine that can ensure appropriate cooling amounts for two exhaust ports, respectively, in an internal combustion engine in which an exhaust port that communicates with an inlet of a turbine of a turbocharger and an exhaust port that does not communicate with the inlet of the turbine are formed in a cylinder head.

Solution to Problem

A first invention for achieving the above object is a cooling apparatus for an internal combustion engine, comprising:

a turbocharger that has a turbine that operates by means of exhaust gas of an internal combustion engine, and a compressor that compresses intake air;

a first exhaust port that is formed in a cylinder head of the internal combustion engine and that communicates with an inlet of the turbine;

a second exhaust port that is formed in the cylinder head and that does not communicate with the inlet of the turbine;

a first exhaust valve that is provided in each cylinder of the internal combustion engine and that communicates with the first exhaust port;

a second exhaust valve that is provided in each cylinder of the internal combustion engine and that communicates with the second exhaust port;

a first cooling water passage that is formed in the cylinder head and through which cooling water that cools the first exhaust port passes; and a second cooling water passage that is formed in the cylinder head and through which cooling water that cools the second exhaust port passes.

A second invention is in accordance with the first invention, wherein:

positions of the first exhaust valve and the second exhaust valve are arranged so as to be inverted between adjacent cylinders;

further comprising:

a first exhaust port merging portion which is formed by merging, inside the cylinder head, of the first exhaust port that communicates with the first exhaust valve of one cylinder and the first exhaust port that communicates with the first exhaust valve of another cylinder among two cylinders in which the first exhaust valves are positioned adjacent to each other; and a second exhaust port merging portion which is formed by merging, inside the cylinder head, of the second exhaust port that communicates with the second exhaust valve of one cylinder and the second exhaust port that communicates with the second exhaust valve of another cylinder among two cylinders in which the second exhaust valves are positioned adjacent to each other.

A third invention is in accordance with the second invention, wherein:

the first cooling water passage is formed at least at a periphery of the first exhaust port merging portion; and the second cooling water passage is formed at least at a periphery of the second exhaust port merging portion.

A fourth invention is in accordance with any one of the first to third inventions, further comprising:

flow rate ratio adjusting means that is capable of changing a ratio of a cooling water flow rate between the first cooling water passage and the second cooling water passage; and flow rate ratio control means that controls a ratio of a cooling water flow rate between the first cooling water passage and the second cooling water passage by controlling the flow rate ratio adjusting means based on a ratio of an exhaust gas flow rate between the first exhaust port and the second exhaust port.

A fifth invention is in accordance with the fourth invention, wherein:

the flow rate ratio control means has a map that specifies a target ratio of a cooling water flow rate between the first cooling water passage and the second cooling water passage with respect to a ratio of an exhaust gas flow rate between the first exhaust port and the second exhaust port;

further comprising:

means that detects a rapid acceleration demand with respect to the internal combustion engine; and restricting means that, when the rapid acceleration demand is detected, restricts so that a proportion of a cooling water flow rate of the first cooling water passage becomes temporarily less than a value that is specified from the map.

A sixth invention is in accordance with the fifth invention, further comprising:

means that predicts whether or not there is a risk of a temperature of the first exhaust port or the turbine reaching an allowable upper limit in a case where a proportion of a cooling water flow rate of the first cooling water passage is restricted by the restricting means; and means that releases a restriction by the restricting means when it is predicted that there is a risk.

A seventh invention is in accordance with any one of the fourth to sixth inventions, further comprising:

means that detects a failure of the flow rate ratio adjusting means; and means that restricts an exhaust gas flow rate of the first exhaust port when a failure of the flow rate ratio adjusting means is detected.

An eighth invention is in accordance with any one of the first to seventh inventions, wherein:

the second exhaust port is formed so that a position thereof in a height direction of a cylinder is different compared to the first exhaust port.

Advantageous Effects of Invention

According to the first invention, by separately forming a first cooling water passage that cools a first exhaust port that communicates with an inlet of a turbine of a turbocharger and a second cooling water passage that cools a second exhaust port that does not communicate with an inlet of a turbine, a cooling amount of the first exhaust port and a cooling amount of the second exhaust port are made to differ from each other, and cooling amounts can be obtained that are appropriate for the respective exhaust ports. It is thus possible to prevent an excessive increase in the temperature of the first exhaust port through which high pressure exhaust gas flows that flows into the turbine, or excessive cooling of the second exhaust port.

According to the second invention, the surface area of an exhaust port inner surface can be decreased by adopting an arrangement whereby the positions of the first exhaust valve and the second exhaust valve are inverted between adjacent cylinders, and first exhaust ports of two cylinders in which first exhaust valves are adjacently positioned are merged with each other inside the cylinder head and second exhaust ports of two cylinders in which second exhaust valves are adjacently positioned are merged with each other inside the cylinder head. Since it is thereby possible to suppress a decrease in the temperature of exhaust gas when the exhaust gas passes through an exhaust port, the amount of exhaust energy supplied to a catalytic converter or a turbocharger can be increased.

According to the third invention, by forming a first cooling water passage at least at a periphery of a first exhaust port merging portion and forming a second cooling water passage at least at a periphery of a second exhaust port merging portion, the first cooling water passage and the second cooling water passage need not be intricate, and the first cooling water passage and the second cooling water passage can be separated in an orderly manner. Consequently, it is easy to make the cooling strengths of the first exhaust port and the second exhaust port differ from each other, and manufacture of the cylinder head is also facilitated.

According to the fourth invention, a ratio of a cooling water flow rate between a first cooling water passage and a second cooling water passage can be controlled based on a ratio of an exhaust gas flow rate between a first exhaust port and a second exhaust port. Consequently, the cooling amount of the first exhaust port and the cooling amount of the second exhaust port can be optimally controlled, respectively, in accordance with the operating state of the internal combustion engine.

According to the fifth invention, when a rapid acceleration demand is detected, a proportion of the cooling water flow rate of the first cooling water passage can be restricted so as to become temporarily less than a value specified from a map. It is thus possible to increase the exhaust energy that flows into the turbocharger at the time of rapid acceleration and enhance the responsiveness of an increase in turbine rotations. Consequently, the acceleration performance can be improved.

According to the sixth invention, when a proportion of the cooling water flow rate of the first cooling water passage has been restricted at a time of rapid acceleration, it is predicted whether or not there is a risk of a temperature of the first exhaust port or the turbine reaching an allowable upper limit. When it is predicted that such a risk exists, the restriction of the ratio of the cooling water flow rate can be released. Therefore, even if the ratio of the cooling water flow rate of the first cooling water passage has been restricted at a time of rapid acceleration, the first exhaust port and the turbine can be protected more securely.

According to the seventh invention, an exhaust gas flow rate of the first exhaust port can be restricted when a failure of means that adjusts a ratio of a cooling water flow rate between a first cooling water passage and a second cooling water passage is detected. Thus, the first exhaust port and the turbine can be protected more securely at a time of aforementioned failure also.

According to the eighth invention, by forming the first exhaust port and the second exhaust port so that the positions thereof in the height direction of the cylinder are different to each other, manufacturing is facilitated when separately forming the first cooling water passage and the second cooling water passage.

DESCRIPTION OF EMBODIMENTS

Figure 1:
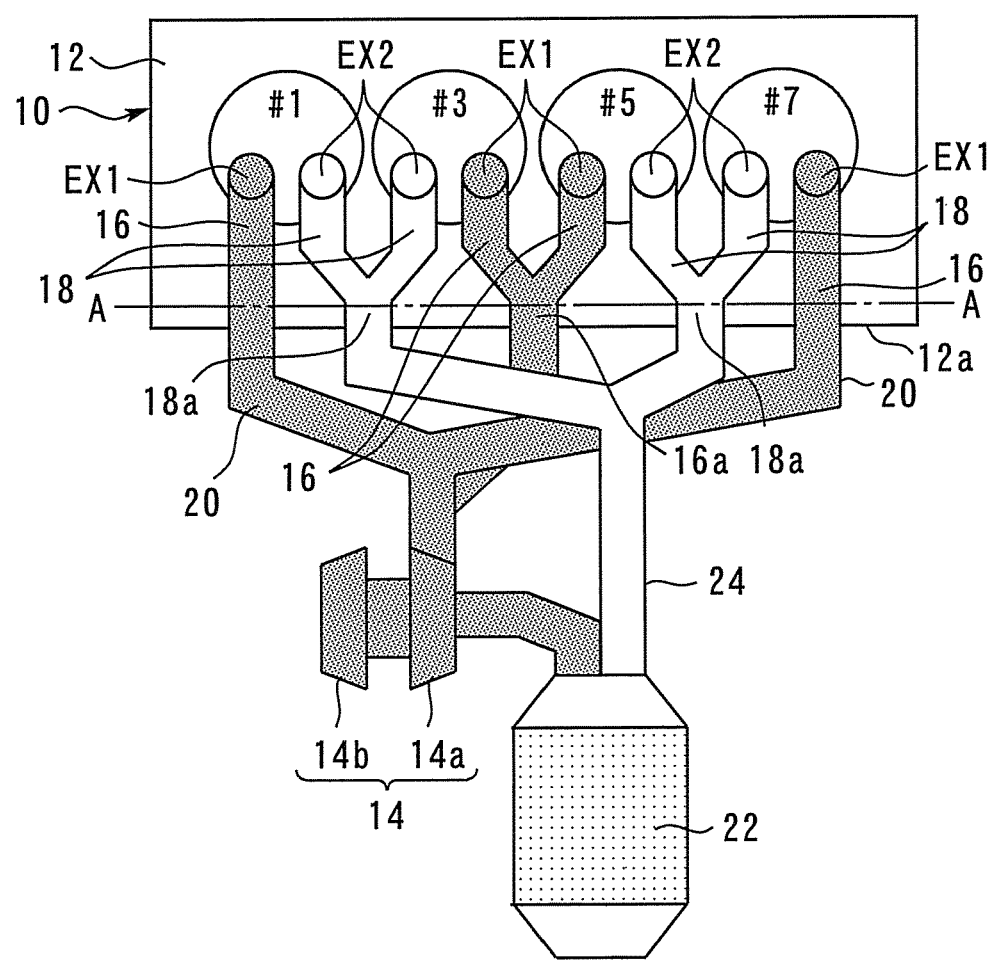
FIG. 1 is a schematic plan view for describing an exhaust system of an internal combustion engine of Embodiment 1 of the present invention.

Embodiments of the present invention are described hereunder with reference to the drawings. Elements that are common to respective drawings are denoted by the same reference numerals, and a duplicate description of such elements is omitted below.

Embodiment 1

FIG. 1 is a schematic plan view for describing an exhaust system of an internal combustion engine of Embodiment 1 of the present invention. In FIG. 1, a number that follows the symbol # represents a cylinder number.

Although an internal combustion engine 10 of the present embodiment shown in FIG. 1 is a V8-cylinder engine, only one bank thereof that includes a first, third, fifth, and seventh cylinder is shown in FIG. 1. However, in the present invention, the number of cylinders of the internal combustion engine 10 and the cylinder arrangement is not limited thereto.

The internal combustion engine 10 includes a turbocharger 14 that has a turbine 14a and a compressor 14b. The turbine 14a operates by means of exhaust gas energy. Intake air can be compressed by driving the compressor 14b using the turbine 14a.

A turbo-side exhaust port (first exhaust port) 16 that communicates with an inlet of the turbine 14a and a bypass-side exhaust port (second exhaust port) 18 that does not communicate with the inlet of the turbine 14a are respectively formed in a cylinder head 12 of the internal combustion engine 10. The turbo-side exhaust port 16 is connected to the inlet of the turbine 14a by an exhaust manifold 20. Exhaust gas that passes through the turbine 14a flows into a catalytic converter 22 for purifying harmful components. The bypass-side exhaust port 18 is directly connected to the catalytic converter 22 by an exhaust manifold 24 without passing through the turbine 14a.

Each cylinder of the internal combustion engine 10 is provided with two exhaust valves, namely, a turbo-side exhaust valve (first exhaust valve) EX1 and a bypass-side exhaust valve (second exhaust valve) EX2. The turbo-side exhaust valve EX1 communicates with the turbo-side exhaust port 16, and the bypass-side exhaust valve EX2 communicates with the bypass-side exhaust port 18.

In the internal combustion engine 10, exhaust gas discharged from the turbo-side exhaust valve EX1 of each cylinder flows into the catalytic converter 22 through the turbine 14a of the turbocharger 14. In contrast, exhaust gas discharged from the bypass-side exhaust valve EX2 of each cylinder flows into the catalytic converter 22 without passing through the turbine 14a of the turbocharger 14.

According to the internal combustion engine 10 of the present embodiment, the positions of the turbo-side exhaust valve EX1 and the bypass-side exhaust valve EX2 are arranged so as to be inverted between adjacent cylinders. Therefore, as shown in FIG. 1, the respective bypass-side exhaust valves EX2 of a first cylinder and a third cylinder that are next to each other are positioned adjacent to each other. The bypass-side exhaust port 18 communicating with the bypass-side exhaust valve EX2 of the first cylinder and the bypass-side exhaust port 18 communicating with the bypass-side exhaust valve EX2 of the third cylinder merge inside the cylinder head 12 to form a merging portion 18a. The merging portion 18a opens to a side surface 12a of the cylinder head 12. Similarly, the bypass-side exhaust port 18 communicating with the bypass-side exhaust valve EX2 of the fifth cylinder and the bypass-side exhaust port 18 communicating with the bypass-side exhaust valve EX2 of the seventh cylinder merge inside the cylinder head 12 to form a merging portion 18a.

The respective turbo-side exhaust valves EX1 of the third cylinder and the fifth cylinder that are next to each other are positioned adjacent to each other. The turbo-side exhaust port 16 communicating with the turbo-side exhaust valve EX1 of the third cylinder and the turbo-side exhaust port 16 communicating with the turbo-side exhaust valve EX1 of the fifth cylinder merge inside the cylinder head 12 to form a merging portion 16a. The merging portion 16a opens to the side surface 12a of the cylinder head 12.

Figure 2:
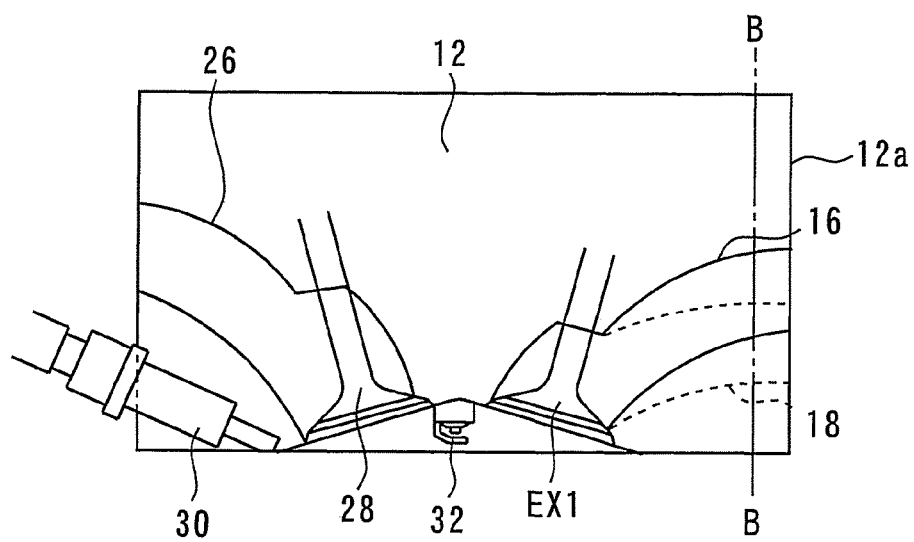
FIG. 2 is a cross-sectional diagram of a cylinder head of the internal combustion engine shown in FIG. 1 along a plane orthogonal to the cylinder arrangement direction.

FIG. 2 is a cross-sectional diagram of the cylinder head 12 of the internal combustion engine shown in FIG. 1 along a plane orthogonal to the cylinder arrangement direction. As shown in FIG. 2, the turbo-side exhaust port 16 and the bypass-side exhaust port 18 are formed at different positions in the height direction (axial direction) of the cylinder. More specifically, the turbo-side exhaust port 16 is formed at a somewhat higher position than the bypass-side exhaust port 18.

As shown in FIG. 2, an intake port 26 is formed in the cylinder head 12. Each cylinder is provided with an intake valve 28 that opens and closes the intake port 26, a fuel injector 30 that injects fuel, and a spark plug 32.

Figure 3:
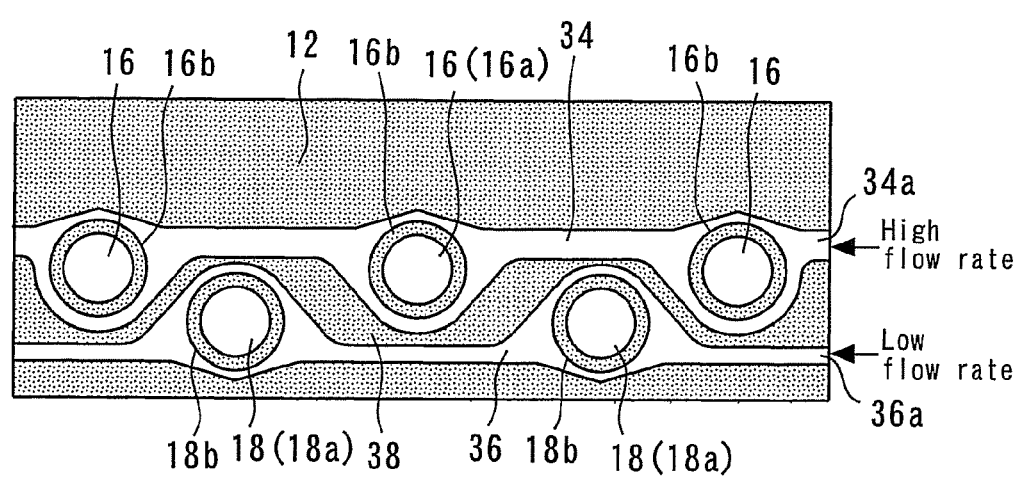
FIG. 3 is a cross-sectional diagram of a cylinder head of an internal combustion engine according to Embodiment 1 of the present invention.

FIG. 3 is a cross-sectional diagram of the cylinder head 12 of the internal combustion engine 10 according to Embodiment 1 of the present invention. The sectional position of the cross-sectional diagram shown in FIG. 3 is represented by a line A-A in FIG. 1 and represented by a line B-B in FIG. 2. More specifically, FIG. 3 is a cross-sectional diagram of the cylinder head 12 along a section that includes a merging portion 16a of the turbo-side exhaust port 16 and a merging portion 18a of the bypass-side exhaust port 18.

As shown in FIG. 3, a first cooling water passage 34 through which cooling water that cools the turbo-side exhaust port 16 passes and a second cooling water passage 36 through which cooling water that cools the bypass-side exhaust port 18 passes are formed inside the cylinder head 12. The first cooling water passage 34 is formed along the cylinder arrangement direction so as to allow cooling water to flow to the periphery of a pipe 16b that forms the turbo-side exhaust port 16. The second cooling water passage 36 is formed along the cylinder arrangement direction so as to allow cooling water to flow to the periphery of a pipe 18b that forms the bypass-side exhaust port 18. The first cooling water passage 34 and the second cooling water passage 36 are separated by a partitioning wall 38 and are independent from each other.

A flow channel cross-sectional area of an inlet 34a of the first cooling water passage 34 is larger than a flow channel cross-sectional area of an inlet 36a of the second cooling water passage 36. Therefore, the cooling water flow rate of the first cooling water passage 34 is greater than the cooling water flow rate of the second cooling water passage 36. Consequently, a cooling amount of the turbo-side exhaust port 16 can be made greater than a cooling amount of the bypass-side exhaust port 18. It is thus possible to reliably inhibit an excessive increase in the temperature of the turbo-side exhaust port 16 or the housing of the turbine 14a downstream thereof. Thus, the internal combustion engine 10 can be reliably protected from dangers such as melting wear. Further, since it is possible to decrease the frequency at which fuel amount increase control is required in order to suppress an increase in the temperature of the turbo-side exhaust port 16 or the turbine housing, a deterioration in fuel consumption or emissions can be suppressed. In this connection, a method for creating a difference between the cooling water flow rate of the first cooling water passage 34 and the cooling water flow rate of the second cooling water passage 36 is not limited to the above described method and, for example, a choke may be provided on the second cooling water passage 36 side.

According to the present embodiment the first cooling water passage 34 and the second cooling water passage 36 are formed at positions that include the merging portion 16a of the turbo-side exhaust port 16 and the merging portion 18a of the bypass-side exhaust port 18. Hence, the first cooling water passage 34 and the second cooling water passage 36 need not be intricate, and the first cooling water passage 34 and the second cooling water passage 36 can be separated in an orderly manner. Consequently, it is easy to make the cooling strengths of the turbo-side exhaust port 16 and the bypass-side exhaust port 18 differ from each other, and manufacture of the cylinder head 12 can also be easily conducted.

According to the present invention, a configuration may also be adopted in which the first cooling water passage 34 and the second cooling water passage 36 are successively formed up to a side (side close to center axis line of cylinder) that is further inward than the positions including the merging portion 16a of the turbo-side exhaust port 16 and the merging portion 18a of the bypass-side exhaust port 18.

Further, according to the present embodiment, by forming the turbo-side exhaust port 16 and the bypass-side exhaust port 18 at positions that are at different heights, manufacturing is facilitated when separately forming the first cooling water passage 34 and the second cooling water passage 36.

Figure 4:
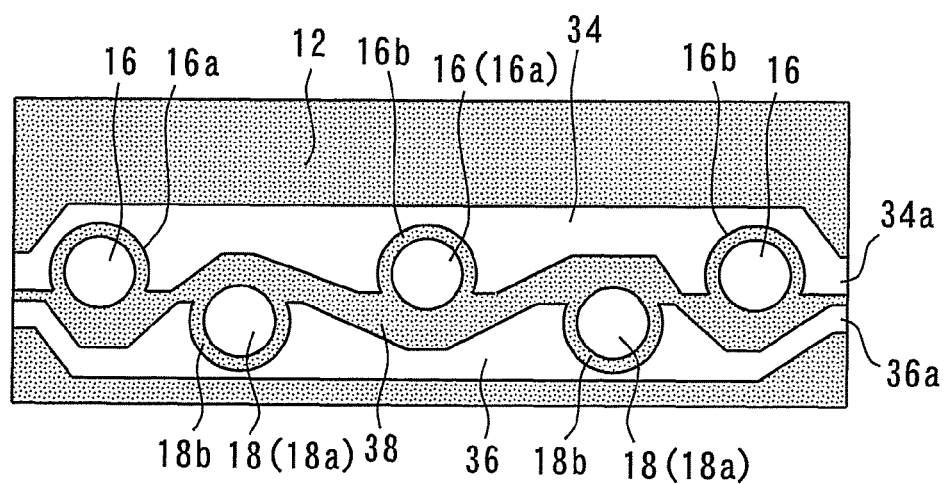
FIG. 4 is a cross-sectional diagram showing a modification example of a cylinder head of the internal combustion engine according to Embodiment 1 of the present invention.

FIG. 4 is a cross-sectional diagram that shows a modification example of the cylinder head 12 of the internal combustion engine 10 according to Embodiment 1 of the present invention. According to the present invention, as shown in FIG. 4, the pipe 16b forming the turbo-side exhaust port 16 and the pipe 18b forming the bypass-side exhaust port 18 may contact with or be integrated into the partitioning wall 38.

Embodiment 2

Next, Embodiment 2 of the present invention is described with reference to FIG. 5 to FIG. 8. The following description centers on the differences between Embodiment 2 and Embodiment 1, and a description of items that are the same as in Embodiment 1 is simplified or omitted.

Figure 5:
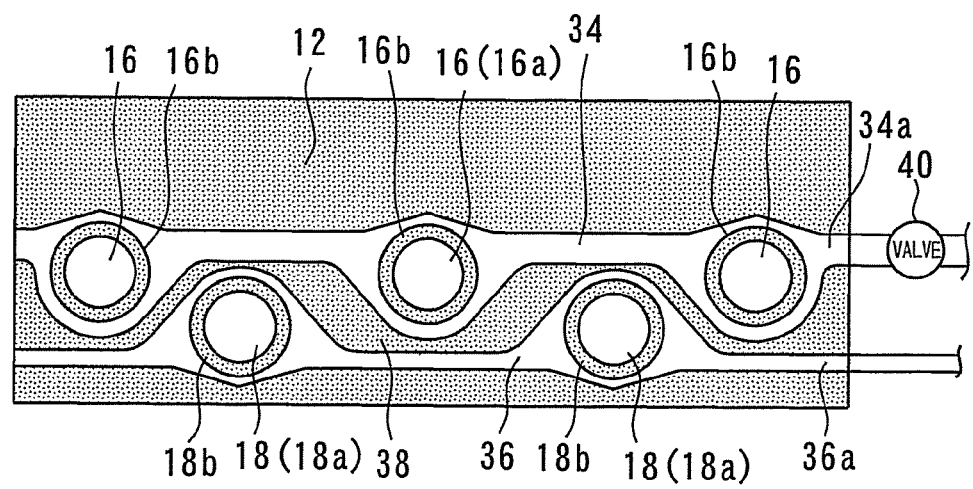
FIG. 5 is a cross-sectional diagram of a cylinder head of an internal combustion engine according to Embodiment 2 of the present invention.

FIG. 5 is a cross-sectional diagram of the cylinder head 12 of the internal combustion engine 10 according to Embodiment 2 of the present invention. As shown in FIG. 5, according to the present embodiment a flow control valve 40 is installed partway along a flow channel to the inlet 34a of the first cooling water passage 34. By adjusting the degree of opening of the flow control valve 40, it is possible to change the cooling water flow rate ratio between the first cooling water passage 34 and the second cooling water passage 36 and adjust the ratio to obtain a target ratio. In the following description, it is assumed that this ratio is represented by the proportion that the cooling water flow rate of the first cooling water passage 34 occupies in the overall cooling water flow rate of the first cooling water passage 34 and the second cooling water passage 36 (hereunder, referred to as "turbo-side cooling water proportion").

According to the present invention, means that adjusts the turbo-side cooling water proportion is not limited to the flow control valve 40. For example, the turbo-side cooling water proportion may be adjusted by controlling the cooling water pump.

Figure 6:
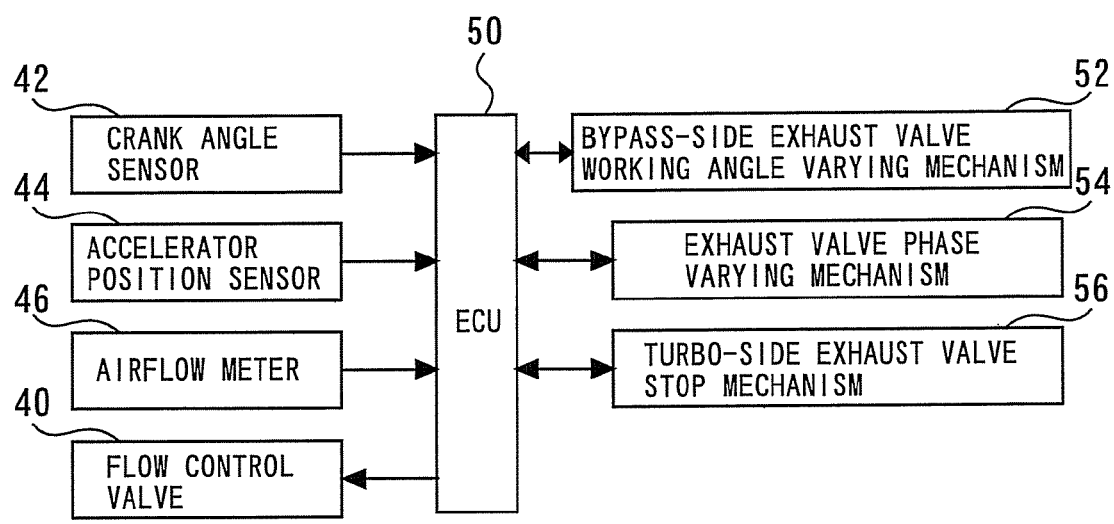
FIG. 6 is a block diagram showing a system configuration of Embodiment 2 of the present invention.

FIG. 6 is a block diagram that shows the system configuration of Embodiment 2 of the present invention. As shown in FIG. 6, the system of the present embodiment includes a crank angle sensor 42 that detects a rotation angle of a crank shaft (output shaft) of the internal combustion engine 10, an accelerator position sensor 44 that detects an accelerator pedal position (hereunder, referred to as "accelerator opening") of a vehicle in which the internal combustion engine 10 is mounted, an airflow meter 46 that detects an intake air amount of the internal combustion engine 10, a bypass-side exhaust valve working angle varying mechanism 52, an exhaust valve phase varying mechanism 54, and a turbo-side exhaust valve stop mechanism 56. These sensors and actuators and the flow control valve 40 are electrically connected to an ECU (Electronic Control Unit) 50.

The ECU 50 can calculate the engine speed based on a signal from the crank angle sensor 42. The ECU 50 can also calculate the engine load based on the intake air amount, the fuel injection amount and the like.

The bypass-side exhaust valve working angle varying mechanism 52 is configured so as that a working angle (length of an open valve period) of the bypass-side exhaust valve EX2 can be changed continuously or in steps between a predetermined maximum working angle and minimum working angle. Further, although the minimum working angle of the bypass-side exhaust valve EX2 is not particularly limited, according to the present embodiment it is assumed that the minimum working angle is substantially zero. More specifically, in the present embodiment, it is assumed that the bypass-side exhaust valve EX2 can be stopped in a substantially closed state.

The exhaust valve phase varying mechanism 54 is configured so as to be capable of making a valve timing (valve-opening phase) of the turbo-side exhaust valve EX1 and the bypass-side exhaust valve EX2 successively slower or faster by successively changing the phase of a camshaft that drives the turbo-side exhaust valve EX1 and the bypass-side exhaust valve EX2. Further, the turbo-side exhaust valve stop mechanism 56 is configured as a mechanism that can be switched so as to cause the turbo-side exhaust valve EX1 to stop in a closed state.

In this connection, various mechanisms in the public domain can be adopted as the specific structure of the above described bypass-side exhaust valve working angle varying mechanism 52, exhaust valve phase varying mechanism 54, and turbo-side exhaust valve stop mechanism 56, and therefore a description thereof is omitted herein.

According to the present embodiment, the ECU 50 can control the exhaust gas flow rate ratio between the turbo-side exhaust port 16 and the bypass-side exhaust port 18 by controlling operations of the bypass-side exhaust valve working angle varying mechanism 52, the exhaust valve phase varying mechanism 54, the turbo-side exhaust valve stop mechanism

56 based on the operating state of the internal combustion engine 10. In the following description, it is assumed that this ratio is represented by the proportion of the exhaust gas quantity flowing to the turbo-side exhaust port 16 with respect to the entire exhaust gas quantity (hereunder, referred to as "turbo-side exhaust gas proportion"). More specifically, the turbo-side exhaust gas proportion is the proportion of the exhaust gas quantity that flows into the turbine 14a of the turbocharger 14 with respect to the overall exhaust gas quantity. In the present embodiment, for example, the ECU 50 controls the turbo-side exhaust gas proportion in the manner described below.

(Non-Supercharged Region)

In a non-supercharged region such as a low load region, the turbo-side exhaust valve EX1 is stopped in a closed state by the turbo-side exhaust valve stop mechanism 56, and only the bypass-side exhaust valve EX2 is opened and closed. As a result, all of the exhaust gas can be flowed to the bypass-side exhaust port 18. More specifically, the turbo-side exhaust gas proportion can be made 0%. In this connection, at a time of cold starting also, there is the advantage that by making the turbo-side exhaust gas proportion 0%, all of the exhaust gas can be flowed to the catalytic converter 22 without passing through the turbine 14a, so that the catalytic converter 22 can be warmed up at an early stage.

(Low Rotation/High Load Region)

A low rotation/high load region is an operating region in which a response delay of a supercharging pressure (a so-called "turbo lag") is most liable to occur. Therefore, in a low rotation/high load region, control is performed to make the working angle of the bypass-side exhaust valve EX2 zero (or a small working angle) by means the bypass-side exhaust valve working angle varying mechanism 52, and to open and close only the turbo-side exhaust valve EX1. As a result, all the exhaust gas can be flowed into the turbine 14a of the turbocharger 14. More specifically, the turbo-side exhaust gas proportion can be made 100%. It is thereby possible to quickly increase the rotations of the turbocharger 14 and suppress the occurrence of a response delay of a supercharging pressure.

In a region other than the aforementioned regions, by changing the working angle of the bypass-side exhaust valve EX2 in accordance with the engine load and the like, it is possible to perform control to change the turbo-side exhaust gas proportion successively or in steps to obtain the optimal turbo-side exhaust gas proportion. For example, in a high rotation/high load region, by opening the turbo-side exhaust valve EX1 from the first half to the middle stage of the exhaust stroke, high energy exhaust gas is supplied to the turbine 14a, and by opening the bypass-side exhaust valve EX2 in the final stage of the exhaust stroke, the exhaust valve can be made to overlap with the intake valve 28 to thereby obtain the effect of scavenging residual gas in the cylinder.

Note that the above described variable valve actuation configuration and valve-opening characteristics control represent one example, and the present invention is not limited thereto and may be any configuration as long as the configuration can change the turbo-side exhaust gas proportion.

Figure 7:
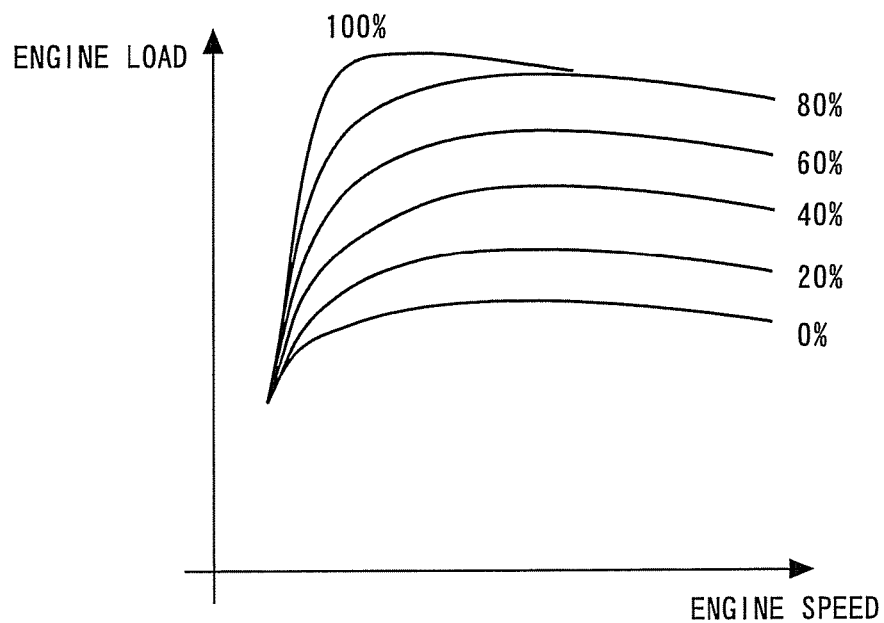
FIG. 7 is a map illustrating the relation between engine speed and engine load and a turbo-side exhaust gas proportion.

As described above, according to the present embodiment control is performed that changes the turbo-side exhaust gas proportion based on the operational state (engine speed and engine load) of the internal combustion engine 10. FIG. 7 is a map that shows the relation between the engine speed and engine load and the turbo-side exhaust gas proportion. The plurality of curves in FIG. 7 are obtained by connecting equivalent engine operating points of the turbo-side exhaust gas proportion.

Figure 8:
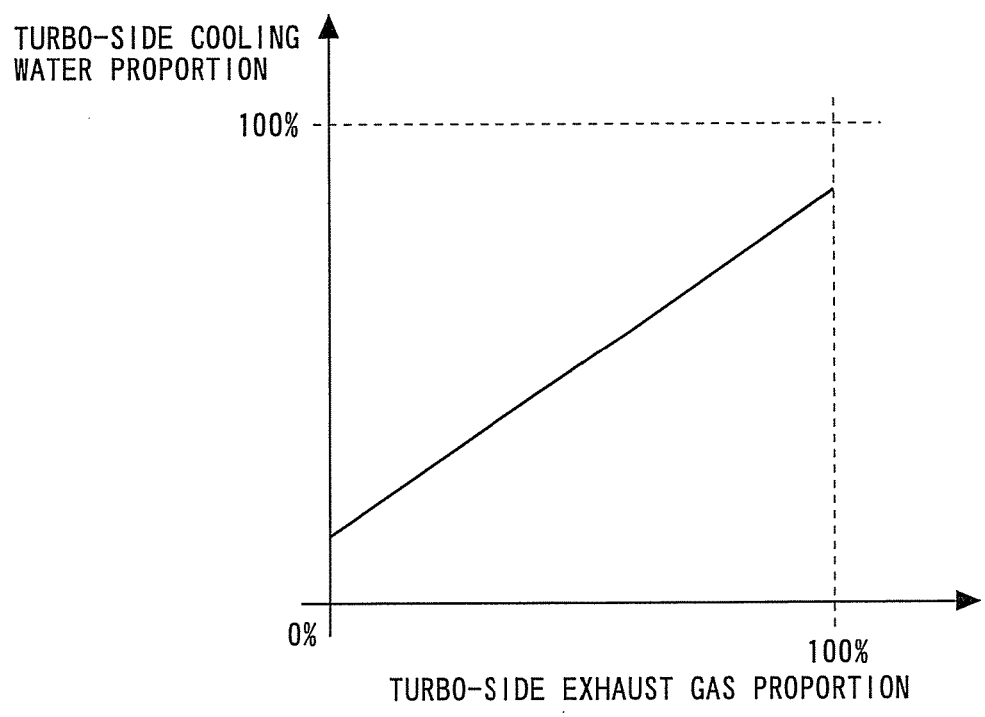
FIG. 8 is a map illustrating the relation between a turbo-side exhaust gas proportion and a turbo-side cooling water proportion.

According to the present embodiment, the turbo-side cooling water proportion is controlled based on the turbo-side exhaust gas proportion. FIG. 8 is a map that shows the relation between the turbo-side exhaust gas proportion and the turbo-side cooling water proportion. According to the present embodiment, first, the ECU 50 calculates the turbo-side exhaust gas proportion based on the engine load and engine speed as well as the map shown in FIG. 7. Next, the ECU 50 takes a turbo-side cooling water proportion that is calculated based on the calculated turbo-side exhaust gas proportion and the map of FIG. 8 as a target value, and controls the degree of opening of the flow control valve 40 so as to realize the target value.

According to the present embodiment, as shown in FIG. 8, control can be performed so that the turbo-side cooling water proportion becomes low when the turbo-side exhaust gas proportion is low, and the turbo-side cooling water proportion becomes high when the turbo-side exhaust gas proportion is high. In an operating region in which the turbo-side exhaust gas proportion is low, it is not necessary to increase the turbo-side cooling water proportion since there is no risk of the temperature of the turbo-side exhaust port 16 or turbine housing increasing excessively. Rather, increasing the turbo-side cooling water proportion may result in a decrease in the temperature of exhaust gas flowing into the turbocharger 14 and lead to a decline in the efficiency of exhaust energy recovery by the turbocharger 14. Thus, according to the present embodiment, in an operating region in which the turbo-side exhaust gas proportion is low, the temperature of exhaust gas that flows into the turbocharger 14 can be kept at a high temperature by lowering the turbo-side cooling water proportion. Consequently, the efficiency of exhaust energy recovery by the turbocharger 14 can be improved.

According to the present embodiment an example is described in which the turbo-side cooling water proportion is controlled based on the ratio between the exhaust gas flow rates of the turbo-side exhaust port 16 and the bypass-side exhaust port 18. However, a configuration may also be adopted in which the turbo-side cooling water proportion is controlled based on a ratio of heat quantities of exhaust gas of the turbo-side exhaust port 16 and the bypass-side exhaust port 18. In such a case, maps may be created that correspond to FIG. 7 and FIG. 8 based on the ratio of heat quantities of exhaust gas of the turbo-side exhaust port 16 and the bypass-side exhaust port 18, and control may be executed based on those maps.

In the above described Embodiment 2, the flow control valve 40 corresponds to "flow rate ratio adjusting means" according to the fourth invention. Further, "flow rate ratio control means" according to the fourth invention is implemented by the ECU 50 controlling the degree of opening of the flow control valve 40 based on the map shown in FIG. 7 and the map shown in FIG. 8.

Embodiment 3

Next, Embodiment 3 of the present invention is described with reference to FIG. 9 to FIG. 12. The following description centers on the differences between Embodiment 3 and the above described embodiments, and a description of items that are the same as in the above described embodiments is simplified or omitted.

According to the above described Embodiment 2, control is performed so that the turbo-side cooling water proportion increases in accordance with an increase in the turbo-side exhaust gas proportion. For this reason, in a high load region in which the turbo-side exhaust gas proportion is high, an excessive increase in the temperature of the turbo-side exhaust port 16 or the turbine housing can be more reliably prevented.

However, when an acceleration demand that is greater than or equal to a predetermined degree (hereunder, referred to as "rapid acceleration") is detected such as when the accelerator opening suddenly increases, it is desirable to increase as much as possible the exhaust energy flowing into the turbocharger 14 and enhance the responsiveness of an increase in turbine rotations in order to improve the acceleration performance. From that viewpoint it is desirable to inhibit cooling of the turbo-side exhaust port 16 without increasing the turbo-side cooling water proportion during rapid acceleration. Further, if the period is one in which rapid acceleration is executed temporarily, there is little risk that the temperature of the turbo-side exhaust port 16 or the turbine housing will rise excessively, even if the turbo-side cooling water proportion is not increased in accompaniment with an increase in the engine load. Therefore, according to the present embodiment, an increase in the turbo-side cooling water proportion is temporarily restricted when performing rapid acceleration.

Figure 9:
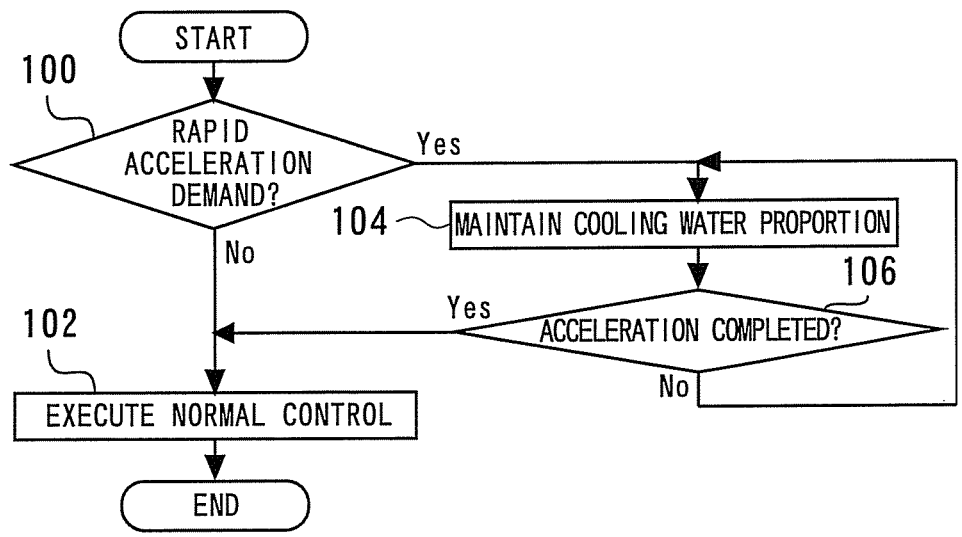
FIG. 9 is a flowchart of a routine executed according to Embodiment 3 of the present invention.

FIG. 9 is a flowchart of a routine that the ECU 50 executes according to the present embodiment in order to implement the above functions. According to the routine shown in FIG. 9, first the ECU 50 determines whether or not there is a rapid acceleration demand (step 100). Although a method of determining a rapid acceleration demand is not particularly limited, for example, it is determined that there is a rapid acceleration demand when the amount of increase in the accelerator opening that is detected with the accelerator position sensor 44 is greater than or equal to a predetermined value. In contrast, when the detected amount of increase in the accelerator opening is less than the predetermined value it is determined that there is not a rapid acceleration demand.

In the aforementioned step 100, if it is determined that there is not a rapid acceleration demand, normal cooling water control (hereunder, referred to as "normal control") is executed (step 102). The normal control is the same as the control described in Embodiment 2 above. More specifically, first, the ECU 50 calculates the turbo-side exhaust gas proportion based on the engine speed and engine load as well as the map in FIG. 7. Next, a turbo-side cooling water proportion that is calculated based on the calculated turbo-side exhaust gas proportion and the map of FIG. 8 is taken as a target value, and the degree of opening of the flow control valve 40 is controlled so as to realize the target value.

Figure 10:
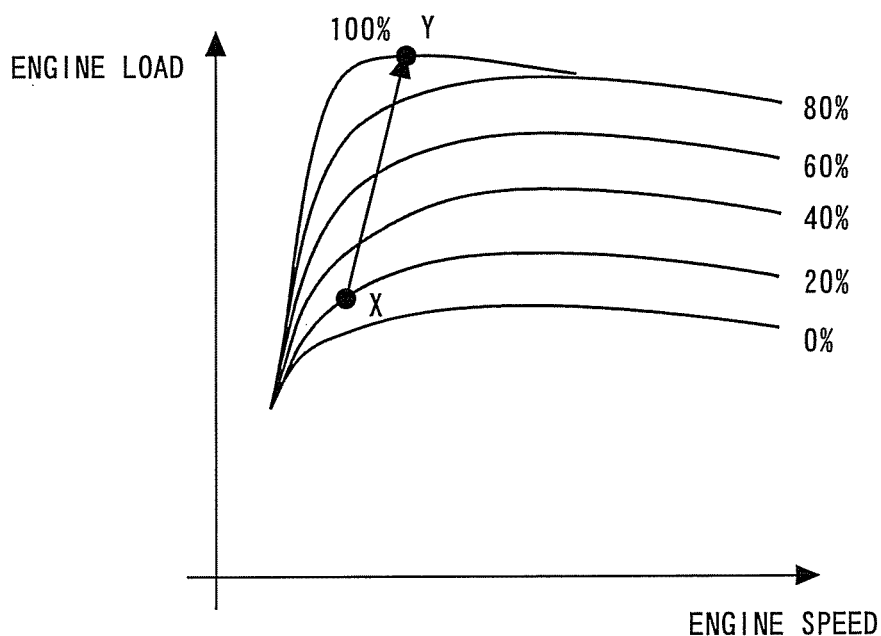
FIG. 10 is a map illustrating the relation between engine speed and engine load and a turbo-side exhaust gas proportion.
Figure 11:
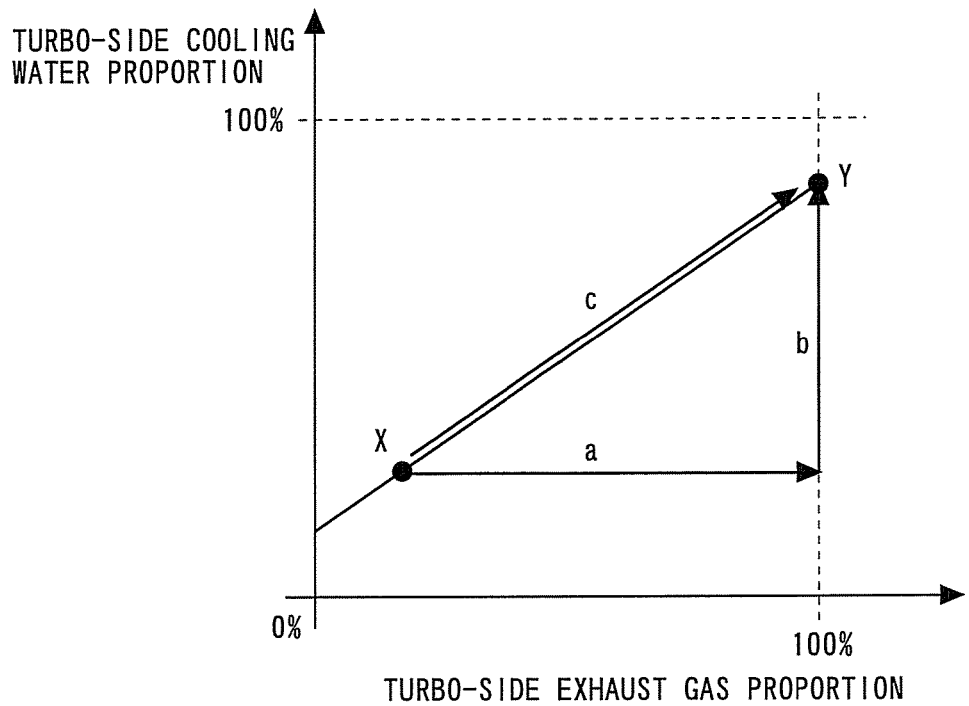
FIG. 11 is a map illustrating the relation between a turbo-side exhaust gas proportion and a turbo-side cooling water proportion.
Figure 12:
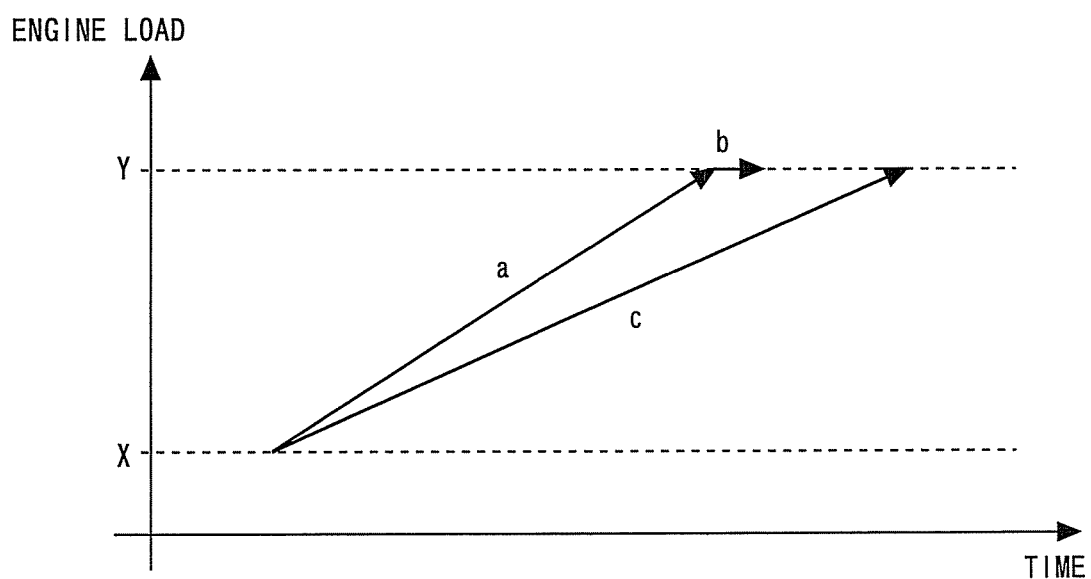
FIG. 12 is a view showing changes over time in the engine load at a time of rapid acceleration.

In contrast, if it is determined in the aforementioned step 100 that there is a rapid acceleration demand, the control described below is executed. FIG. 10 is a map that is similar to the map shown in FIG. 7. FIG. 11 is a map that is similar to the map shown in FIG. 8. FIG. 12 is a view that illustrates changes over time in the engine load at a time of rapid acceleration. In the following description, reference characters X and Y in FIG. 10 to FIG. 12 are taken to denote an operating point at the start of rapid acceleration and an operating point at the end of rapid acceleration, respectively.

When it is determined in the aforementioned step 100 that there is a rapid acceleration demand, first the turbo-side cooling water proportion at the time point at which rapid acceleration starts is maintained (step 104). During normal control, the turbo-side cooling water proportion is increased in accordance with an increase in the engine load (that is, an increase in the turbo-side exhaust gas proportion) as shown by an arrow c in FIG. 11. In contrast, when the aforementioned step 104 is executed, as shown by an arrow a in FIG. 11, even though the engine load and turbo-side exhaust gas proportion increase, the turbo-side cooling water proportion is maintained at the value thereof at the time point when the rapid acceleration started.

Following the processing in step 104, the ECU 50 determines whether or not acceleration has ended (step 106). Although a method of determining the end of acceleration is not particularly limited, for example, the end of acceleration can be determined based on whether or not the actual engine load has reached a demand load calculated based on the accelerator opening.

When the ECU 50 determines in the aforementioned step 106 that acceleration has not yet ended, the processing of the aforementioned step 104 and thereafter is executed again. More specifically, the turbo-side cooling water proportion is maintained at the value thereof at the time point when the rapid acceleration started.

In contrast, if the ECU 50 determines in the aforementioned step 106 that acceleration has ended, the normal control in the aforementioned step 102 is executed. By executing normal control, as shown by an arrow b in FIG. 11, the turbo-side cooling water proportion is increased as far as a value specified by the map.

In FIG. 12, arrows a and b represent changes over time in the engine load in the case of executing the control illustrated in FIG. 9, and arrow c represents changes over time in the engine load normal control is executed at the time of rapid acceleration also. By executing the control shown in FIG. 9, it is possible to increase the exhaust energy flowing into the turbocharger 14 and improve the responsiveness of an increase in turbine rotations at the time of rapid acceleration by temporarily restricting a rise in the turbo-side cooling water proportion. Therefore, as shown in FIG. 12, the acceleration performance can be enhanced compared to the case of executing normal control at the time of rapid acceleration also.

Although according to the control shown in FIG. 9 the turbo-side cooling water proportion during rapid acceleration execution is maintained at the value thereof at the time point when the rapid acceleration starts, control need not necessarily be performed in this manner. For example, a rising gradient of the turbo-side cooling water proportion during rapid acceleration execution may be made more moderate than a rising gradient of the map shown in FIG. 8 or FIG. 11. More specifically, a configuration need only be adopted that makes the turbo-side cooling water proportion during rapid acceleration execution lower than a value specified from the map shown in FIG. 8 or FIG. 11.

In the above described Embodiment 3, FIG. 8 or FIG. 11 correspond to a "map" in the fifth invention. Further, the "restricting means" according to the fifth invention is implemented by the ECU 50 executing the processing in the aforementioned step 104.

Embodiment 4

Figure 13:
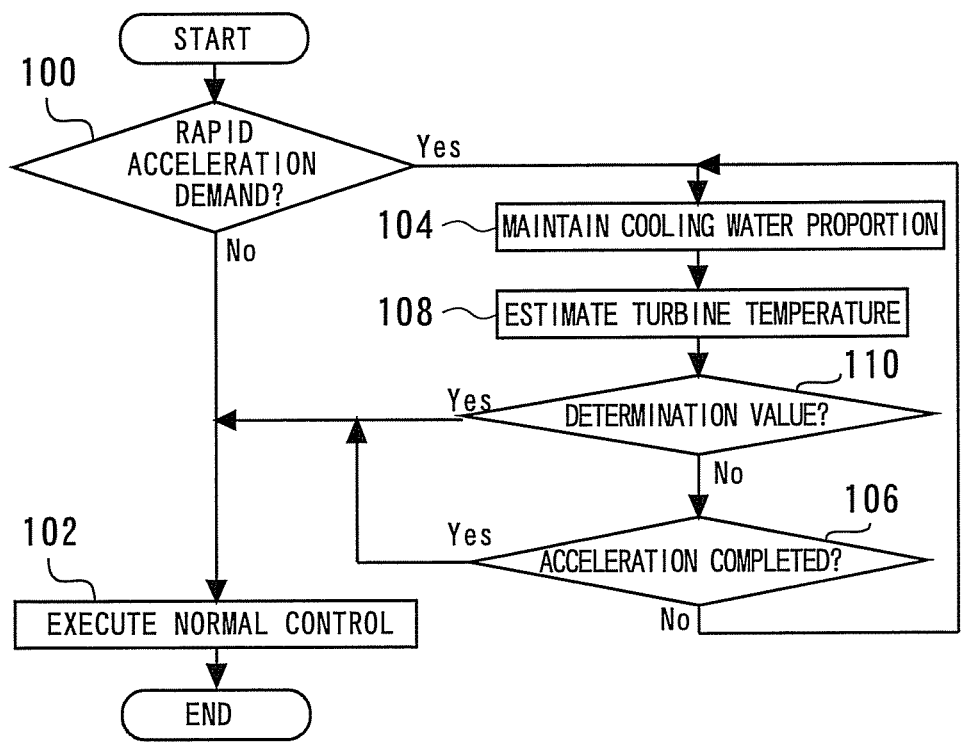
FIG. 13 is a flowchart of a routine executed according to Embodiment 4 of the present invention.
Figure 14:
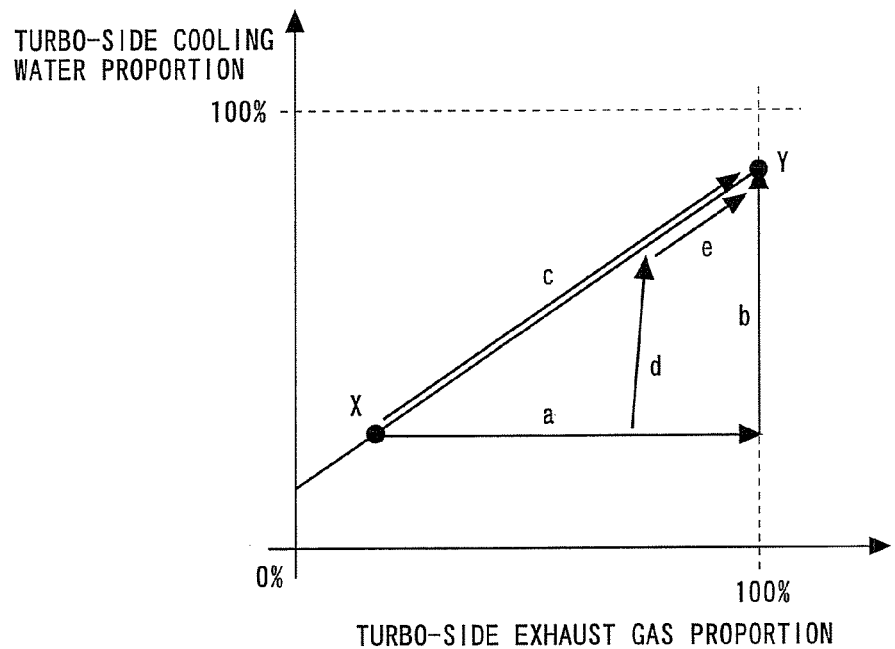
FIG. 14 is a map illustrating the relation between a turbo-side exhaust gas proportion and a turbo-side cooling water proportion.
Figure 15:
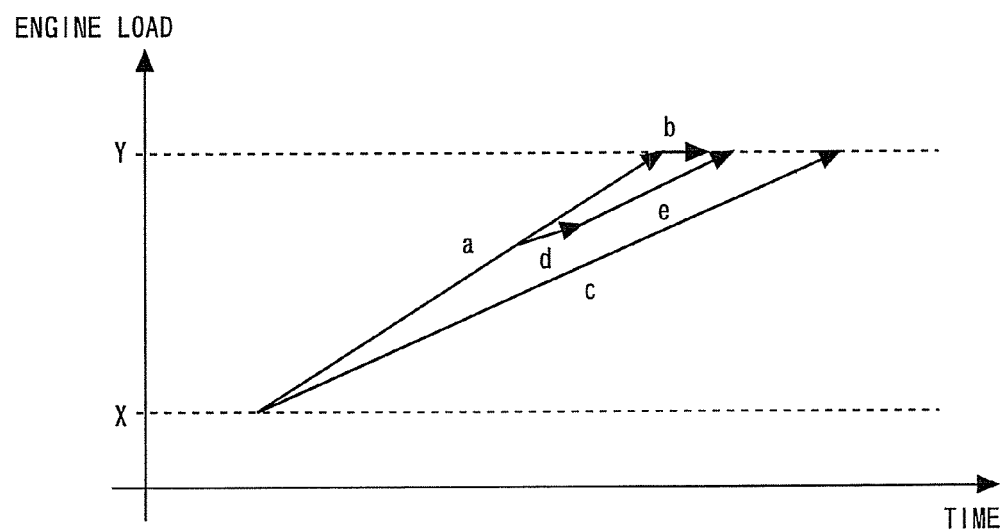
FIG. 15 is a view showing changes over time in the engine load at a time of rapid acceleration.

Next, Embodiment 4 of the present invention is described referring to FIG. 13 to FIG. 15. The following description centers on the differences between Embodiment 4 and the above described embodiments, and a description of items that are the same as in the above described embodiments is simplified or omitted.

According to the above described Embodiment 3, when performing rapid acceleration, the exhaust energy flowing into the turbocharger 14 is increased by temporarily restricting an increase in the turbo-side cooling water proportion and making the turbo-side cooling water proportion a lower value than normal. While an increase in the turbo-side cooling water proportion is being restricted, the temperature of exhaust gas passing through the turbo-side exhaust port 16 temporarily becomes a high temperature. For this reason, when a state in which an increase in the turbo-side cooling water proportion is being restricted is unexpectedly prolonged, the possibility that the temperature of the turbo-side exhaust port 16 or the turbine housing (hereunder, referred to together as "turbine temperature") will increase to close to the allowable upper limit is not zero.

Therefore, according to the present embodiment, when an increase in the turbo-side cooling water proportion is being restricted, it is determined whether or not there is a risk of the turbine temperature reaching the allowable upper limit. If it is determined that such a risk exists, the restriction on an increase in the turbo-side cooling water proportion is released and the control returns to normal control.

FIG. 13 is a flowchart of a routine that the ECU 50 executes according to the present embodiment to implement the above described function. FIG. 14 is a map that is similar to the map shown in FIG. 11. FIG. 15 is a view that shows changes over time in an engine load at a time of rapid acceleration. In the following description, steps in FIG. 13 that are the same as steps in the routine shown in FIG. 9 are denoted by the same reference numbers and a description of the steps is omitted or simplified.

The routine shown in FIG. 13 is the same as the routine shown in FIG. 9 except that steps 108 and 110 are inserted between steps 104 and 106. According to the routine shown in FIG. 13, when it has been determined in step 100 that there is a rapid acceleration demand and, in step 104, the turbo-side cooling water proportion has been maintained at the value thereof at the time point that rapid acceleration starts, next, the current estimated turbine temperature is calculated (step 108). The current estimated turbine temperature can be calculated, for example, based on the estimated turbine temperature at the time point that rapid acceleration starts and the amount of heat that has passed through the turbine up to the current time from the time point that rapid acceleration started. The estimated turbine temperature at the time point that rapid acceleration starts can be calculated by previously preparing a map that shows the relation between engine operating states and the turbine temperature and storing the map in the ECU 50, and applying the engine operating state at the time point that rapid acceleration starts to the map. The amount of heat that has passed through the turbine can be calculated based on the history of the engine load and the engine speed from the time point that rapid acceleration starts.

Next, the current estimated turbine temperature calculated in the aforementioned step 108 and a predetermined determination value are compared (step 110). In step 110, when the current estimated turbine temperature is lower than the aforementioned determination value, it can be determined that there is currently no risk that the turbine temperature will reach the allowable upper limit. Therefore, in this case, the processing of step 106 and thereafter is executed. The processing of step 106 and thereafter is already described in Embodiment 3, and therefore a description thereof is omitted here.

In contrast, in the aforementioned step 110, when the current estimated turbine temperature is greater than or equal to the determination value, it can be determined that there is a risk that the turbine temperature will reach the allowable upper limit. In this case, the normal control of the above described step 102 is executed. By executing the normal control, as shown in FIG. 14, the restriction (arrow a) of an increase in the turbo-side cooling water proportion is released during the rapid acceleration, and the turbo-side cooling water proportion increases (arrow d) as far as a value specified by the map. Thereafter, the turbo-side cooling water proportion increases in accordance with the map (arrow e). Arrows d and e in FIG. 15 correspond to arrows d and e in FIG. 14.

According to the control shown in FIG. 13 as described above, it is possible to more reliably prevent the turbine temperature from exceeding the allowable upper limit even when control is performed that restricts an increase in the turbo-side cooling water proportion at a time of rapid acceleration. Further, as shown in FIG. 15, the acceleration performance can be improved compared to the case (arrow c) of executing normal control from the start at the time of rapid acceleration also.

According to the above described Embodiment 4, "means that predicts" according to the sixth invention is implemented by the ECU 50 executing the processing in the above described steps 108 and 110, and "means that releases a restriction" according to the sixth invention is implemented by the ECU 50 executing the processing in the above described step 102 when the result of the determination in the aforementioned step 110 is "Yes".

Embodiment 5

Figure 16:
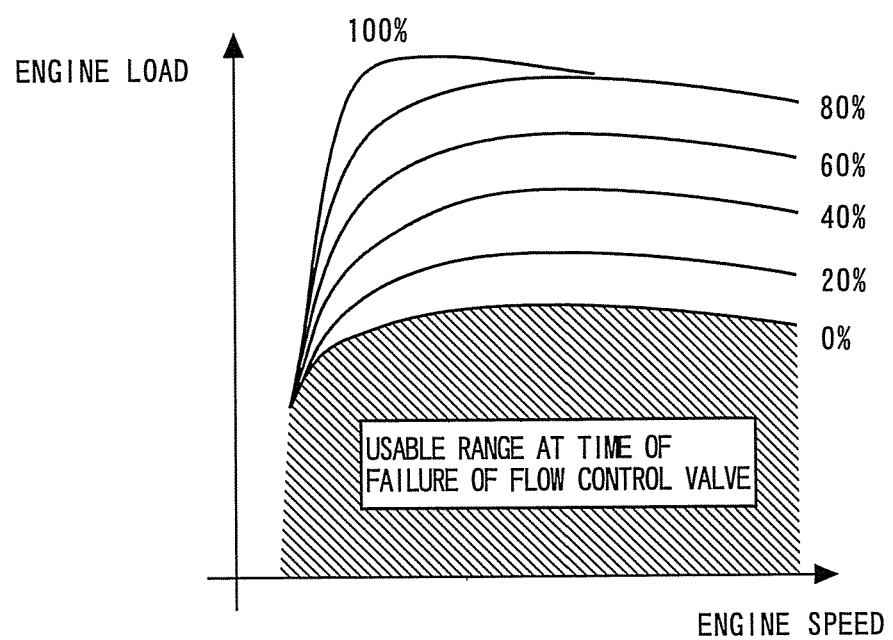
FIG. 16 is a view illustrating an engine load limitation range in a case where a flow control valve has failed.

Next, Embodiment 5 of the present invention is described referring to FIG. 16. The following description centers on the differences between Embodiment 5 and the above described embodiments, and a description of items that are the same as in the above described embodiments is simplified or omitted.

In the event that the flow control valve 40 (flow rate ratio adjusting means) shown in FIG. 5 fails to operate properly and the cooling water of the first cooling water passage 34 has become insufficient or has stopped flowing, there is a risk of the temperature of the turbo-side exhaust port 16 or the turbine housing increasing excessively and damaging the turbo-side exhaust port 16 or the turbine housing. According to the present embodiment, in order to reliably prevent such a situation, when a failure of the flow control valve 40 is detected the exhaust gas flow rate of the turbo-side exhaust port 16 is restricted.

Although a method of detecting a failure of the flow control valve 40 is not particularly limited, for example, a failure of the flow control valve 40 can be determined in a case where, after issuing a command to change the degree of opening of the flow control valve 40, a change does not appear in a detection value of a temperature sensor such as a thermocouple provided in a flow channel on a downstream side of the flow control valve 40.

A method that restricts the engine load may be mentioned as an example of a method that restricts the exhaust gas flow rate of the turbo-side exhaust port 16. FIG. 16 is a view that illustrates an engine load limitation region in a case in which the flow control valve 40 has failed to operate properly. When a failure of the flow control valve 40 is detected, for example, the exhaust gas flow rate of the turbo-side exhaust port 16 can be made zero by performing control that restricts an intake air amount so that the engine load increases only within the range shown by the diagonal lines in FIG. 16. Consequently, even if the cooling water of the first cooling water passage 34 has become insufficient or has stopped flowing, the turbo-side exhaust port 16 or turbine housing can be reliably protected.

However, even if a failure of the flow control valve 40 has been detected, the exhaust gas flow rate of the turbo-side exhaust port 16 need not necessarily be made zero, and the exhaust gas flow rate of the turbo-side exhaust port 16 or the turbo-side exhaust gas proportion need only be restricted so as to be less than or equal to a predetermined value.

REFERENCE SIGNS LIST

EX1 turbo-side exhaust valve
EX2 bypass-side exhaust valve
10 internal combustion engine
12 cylinder head
14 turbocharger
14a turbine
14b compressor
16 turbo-side exhaust port
18 bypass-side exhaust port
20 exhaust manifold
22 catalytic converter
24 exhaust manifold
26 intake port
28 intake valve
34 first cooling water passage
36 second cooling water passage
38 partitioning wall
40 flow control valve

The invention claimed is:

1. A cooling apparatus for an internal combustion engine, comprising:
   a turbocharger that has a turbine that operates by means of exhaust gas of an internal combustion engine, and a compressor that compresses intake air;
   multiple first exhaust ports that are formed in a cylinder head of the internal combustion engine and that communicate with an inlet of the turbine;
   multiple second exhaust ports that are formed in the cylinder head and that do not communicate with the inlet of the turbine;
   a first exhaust valve that is provided in each cylinder of the internal combustion engine and that communicates with a first exhaust port;
   a second exhaust valve that is provided in each cylinder of the internal combustion engine and that communicates with a second exhaust port;
   a first cooling water passage that is formed in the cylinder head and through which only the first exhaust ports pass; and
   a second cooling water passage that is formed in the cylinder head and through which only the second exhaust ports pass.

2. The cooling apparatus for an internal combustion engine according to claim 1, wherein:
   positions of the first exhaust valve and the second exhaust valve are arranged so as to be inverted between adjacent cylinders;
   further comprising:
   a first exhaust port merging portion which is formed by merging, inside the cylinder head, of the first exhaust port that communicates with the first exhaust valve of one cylinder and the first exhaust port that communicates with the first exhaust valve of another cylinder among two cylinders in which the first exhaust valves are positioned adjacent to each other; and
   a second exhaust port merging portion which is formed by merging, inside the cylinder head, of the second exhaust port that communicates with the second exhaust valve of one cylinder and the second exhaust port that communicates with the second exhaust valve of another cylinder among two cylinders in which the second exhaust valves are positioned adjacent to each other.

3. The cooling apparatus for an internal combustion engine according to claim 2, wherein:
   the first cooling water passage is formed at least at a periphery of the first exhaust port merging portion; and
   the second cooling water passage is formed at least at a periphery of the second exhaust port merging portion.

4. The cooling apparatus for an internal combustion engine according to claim 1, further comprising:
   flow rate ratio adjusting means that is capable of changing a ratio of a cooling water flow rate between the first cooling water passage and the second cooling water passage; and
   flow rate ratio control means that controls a ratio of a cooling water flow rate between the first cooling water passage and the second cooling water passage by controlling the flow rate ratio adjusting means based on a ratio of an exhaust gas flow rate between the first exhaust port and the second exhaust port.

5. The cooling apparatus for an internal combustion engine according to claim 4, wherein:
   the flow rate ratio control means has a map that specifies a target ratio of a cooling water flow rate between the first cooling water passage and the second cooling water passage with respect to a ratio of an exhaust gas flow rate between the first exhaust port and the second exhaust port;
   further comprising:
   means that detects a rapid acceleration demand with respect to the internal combustion engine; and
   restricting means that, when the rapid acceleration demand is detected, restricts so that a proportion of a cooling water flow rate of the first cooling water passage becomes temporarily less than a value that is specified from the map.

6. The cooling apparatus for an internal combustion engine according to claim 5, further comprising:
   means that predicts whether or not there is a risk of a temperature of the first exhaust port or the turbine reaching an allowable upper limit in a case where a proportion of a cooling water flow rate of the first cooling water passage is restricted by the restricting means; and
   means that releases a restriction by the restricting means when it is predicted that there is the risk.

7. The cooling apparatus for an internal combustion engine according to claim 4, further comprising:
   means that detects a failure of the flow rate ratio adjusting means; and
   means that restricts an exhaust gas flow rate of the first exhaust port in a case in which a failure of the flow rate ratio adjusting means is detected.

8. The cooling apparatus for an internal combustion engine according to claim 1, wherein the second exhaust port is formed so that a position thereof in a height direction of a cylinder is different compared to the first exhaust port.

9. The cooling apparatus for an internal combustion engine according to of claim 1, further comprising:
   a flow rate ratio adjusting device that is capable of changing a ratio of a cooling water flow rate between the first cooling water passage and the second cooling water passage; and
   a flow rate ratio control device that controls a ratio of a cooling water flow rate between the first cooling water passage and the second cooling water passage by controlling the flow rate ratio adjusting device based on a ratio of an exhaust gas flow rate between the first exhaust port and the second exhaust port.

10. The cooling apparatus for an internal combustion engine according to claim 9, wherein:
- the flow rate ratio control device has a map that specifies a target ratio of a cooling water flow rate between the first cooling water passage and the second cooling water passage with respect to a ratio of an exhaust gas flow rate between the first exhaust port and the second exhaust port;

further comprising:
- a device that detects a rapid acceleration demand with respect to the internal combustion engine; and
- a restricting device that, when the rapid acceleration demand is detected, restricts so that a proportion of a cooling water flow rate of the first cooling water passage becomes temporarily less than a value that is specified from the map.

11. The cooling apparatus for an internal combustion engine according to claim 10, further comprising:
- a device that predicts whether or not there is a risk of a temperature of the first exhaust port or the turbine reaching an allowable upper limit in a case where a proportion of a cooling water flow rate of the first cooling water passage is restricted by the restricting device; and
- a device that releases a restriction by the restricting device when it is predicted that there is the risk.

12. The cooling apparatus for an internal combustion engine according to claim 9, further comprising:
- a device that detects a failure of the flow rate ratio adjusting device; and
- a device that restricts an exhaust gas flow rate of the first exhaust port in a case in which a failure of the flow rate ratio adjusting device is detected.

* * * * *

UNITED STATES PATENT AND TRADEMARK OFFICE
CERTIFICATE OF CORRECTION

PATENT NO. : 8,550,040 B2  Page 1 of 1
APPLICATION NO. : 13/001694
DATED : October 8, 2013
INVENTOR(S) : Okada It is certified that error appears in the above-identified patent and that said Letters Patent is hereby corrected as shown below:

In the Claims
In column 16, line 57, please change "according to of" to -- according to --.

Signed and Sealed this
Fourth Day of February, 2014

Michelle K. Lee
*Deputy Director of the United States Patent and Trademark Office*